(12) United States Patent
Koyagi et al.

(10) Patent No.: US 7,568,904 B2
(45) Date of Patent: Aug. 4, 2009

(54) STEREOLITHOGRAPHY APPARATUS

(75) Inventors: Yasuyuki Koyagi, Kyoto (JP); Hiroko Shimozuma, Kyoto (JP); Hiroshi Yaze, Kyoto (JP); Ichiro Miyaki, Kyoto (JP)

(73) Assignee: Laser Solutions Co., Ltd., Kyoto (JP)

( * ) Notice: Subject to any disclaimer, the term of this patent is extended or adjusted under 35 U.S.C. 154(b) by 138 days.

(21) Appl. No.: 11/358,099

(22) Filed: Feb. 22, 2006

(65) Prior Publication Data

US 2006/0198918 A1 Sep. 7, 2006

(30) Foreign Application Priority Data

Mar. 3, 2005 (JP) ............................. 2005-058571
Mar. 3, 2005 (JP) ............................. 2005-059151

(51) Int. Cl.
 B28B 1/16 (2006.01)
 B29C 35/00 (2006.01)
(52) U.S. Cl. ..................... 425/375; 425/174.4; 700/120
(58) Field of Classification Search .............. 425/174.4, 425/375; 264/308, 401; 700/120, 119, 118
See application file for complete search history.

(56) References Cited

U.S. PATENT DOCUMENTS 5,658,412 A * 8/1997 Retallick et al. ......... 156/272.8

(Continued)

FOREIGN PATENT DOCUMENTS

JP 2000-121495 A 5/2000

(Continued)

*Primary Examiner*—Maria Veronica D Ewald
(74) *Attorney, Agent, or Firm*—McDermott Will & Emery LLP

(57) ABSTRACT

A supply part for supplying resin, a smoothing part for smoothing the resin, and an objective lens for exposing the smoothed resin to light are provided in separate positions within substantially the same horizontal plane, and a modeling part is movable by a horizontal drive mechanism under the three above-mentioned components. For processing in the three above-mentioned components, the modeling part is moved to positions immediately under the three above-mentioned components in order by the horizontal drive mechanism. Thus, the modeling part is brought as close to the three above-mentioned components as possible for processing. The exposure is performed, with the objective lens fixed to a base body. Exposure light is focused onto a resin layer on a modeling base, and the light reflected from the resin layer is received by the objective lens, directed by a beam splitter toward an image surface optical system and received as an image by a CCD camera. During the exposure, the directed exposure light serves as illumination light which enables an operator to check whether current focus is achieved on the surface of the resin layer. During a time interval between the completion of the exposure of the resin layer to light and the execution of the exposure of the next resin layer to light, the fine adjustment of the vertical position of a stage is made, whereby the fine adjustment of the focus position is made in accordance with the result of observation using a monitor. This prevents the decrease in modeling accuracy for the subsequent resin layers, thereby to hold the modeling accuracy for the entire model higher, thereby improving the yield and productivity of models. These provide a stereolithography apparatus which attains a resin layer thickness of 10 μm and an exposure resolution of 2 μm and is preferred for micromachining.

7 Claims, 6 Drawing Sheets

U.S. PATENT DOCUMENTS

| | | | |
|---|---|---|---|
| 5,876,550 A * | 3/1999 | Feygin et al. | 156/264 |
| 6,048,188 A * | 4/2000 | Hull et al. | 425/135 |
| 6,051,179 A * | 4/2000 | Hagenau | 264/401 |
| 6,174,156 B1 * | 1/2001 | Chapman et al. | 425/174.4 |
| 6,406,658 B1 * | 6/2002 | Manners et al. | 264/401 |
| 6,500,378 B1 * | 12/2002 | Smith | 264/401 |
| 6,621,060 B1 * | 9/2003 | Nantel et al. | 250/201.4 |
| 6,733,267 B2 * | 5/2004 | Chapman et al. | 425/174.4 |
| 6,831,737 B2 * | 12/2004 | Uto et al. | 356/237.4 |
| 7,088,432 B2 | 8/2006 | Zhang | |
| 2004/0160590 A1 | 8/2004 | Koyagi et al. | |

FOREIGN PATENT DOCUMENTS

| | | |
|---|---|---|
| JP | 2000-141495 A | 5/2000 |
| JP | 3294833 | 4/2002 |
| JP | 2002-316363 | 10/2002 |
| JP | 2004-223789 A | 8/2004 |
| JP | 2004-249508 A | 9/2004 |

* cited by examiner

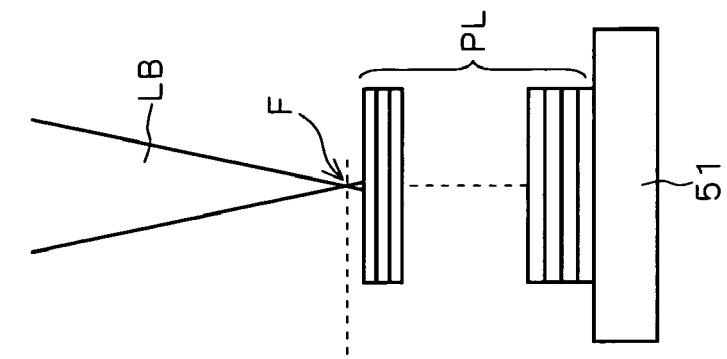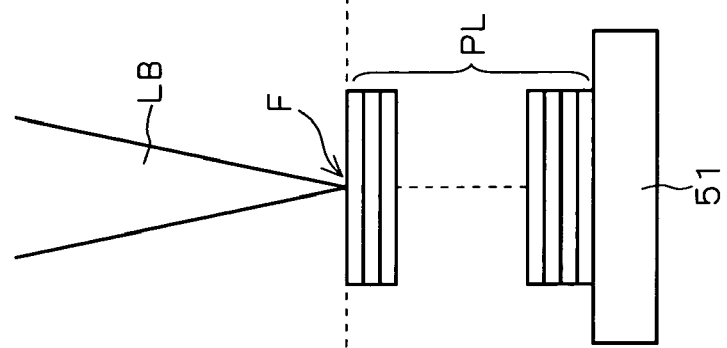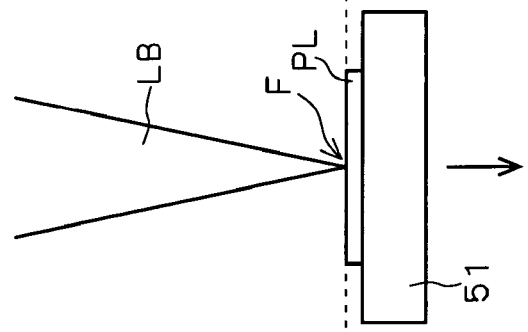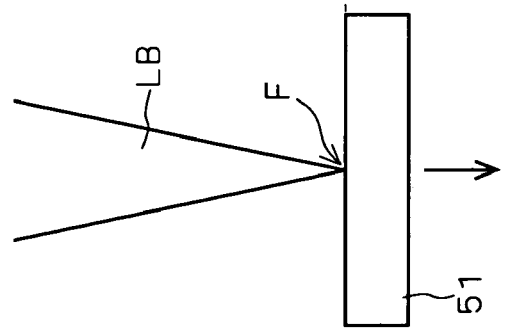

F I G . 5 A
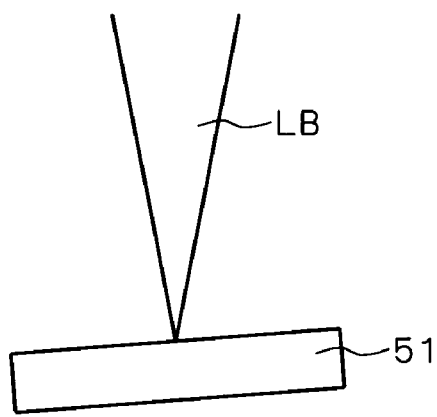
F I G . 5 B
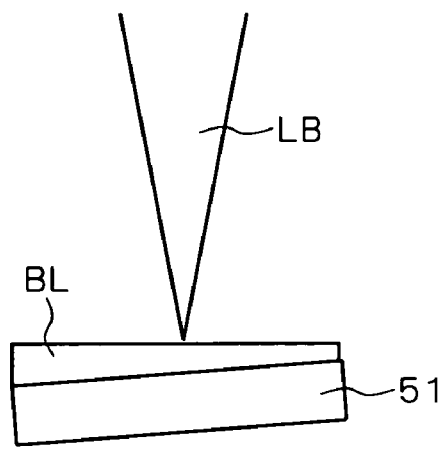

F I G . 6
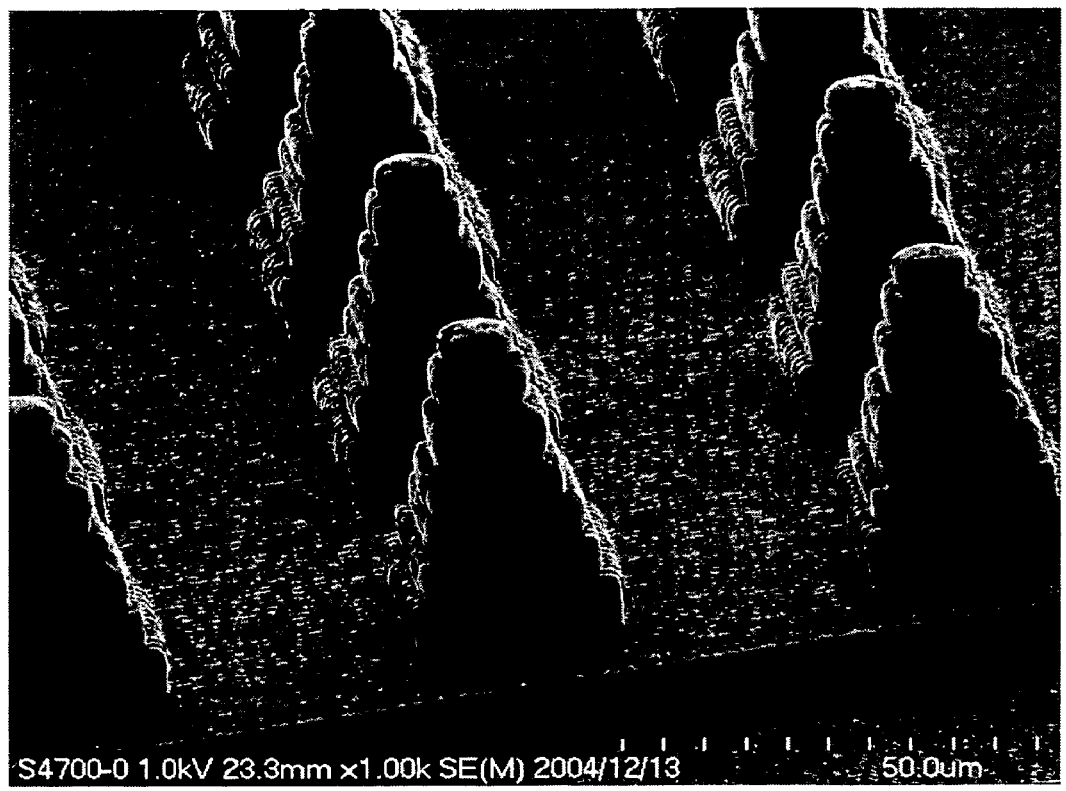

STEREOLITHOGRAPHY APPARATUS

BACKGROUND OF THE INVENTION

1. Field of the Invention

The present invention relates to a stereolithography apparatus for creating a three-dimensional object by irradiating a predetermined photo-curable resin with light such as laser light. More particularly, the invention relates to a stereolithography apparatus suitable for the creation of an object having a size on the order of microns.

2. Description of the Background Art

A stereolithography technique is already known in the art such that cross-sectional shape data representing the shapes of a plurality of cross-sections into which a three-dimensional object is sliced from bottom to top at predetermined spacing is previously generated based on three-dimensional shape data (e.g., CAD data) representing the three-dimensional object, and planar resin layers representing the respective sliced cross-sections are successively formed based on the cross-sectional shape data by curing a photo-curable resin whereas one planar resin layer is stacked on top of another each time the planar resin layer is formed, whereby a model corresponding to the three-dimensional object is created. A stereolithography apparatus for implementing the stereolithography technique is also known in the art. The stereolithography technique and apparatus are disclosed, for example, in Japanese Patent Application Laid-Open No. 2004-249508, Japanese Patent Application Laid-Open No. 2004-223789, and Japanese Patent No. 3294833. A variety of methods of modeling have been proposed. These methods are based on a generally common technique in creating a model by repeating the formation of a resin layer and the stacking of the resin layer on top of another, the formation of the resin layer being accomplished by irradiating an uncured photo-curable resin within an irradiation area determined by the cross-sectional shape data with exposure light such as, for example, laser light.

The stereolithography technique, in which a model can be relatively easily created from design data for embodying the model, has been conventionally used in prototyping a variety of products. In recent years, models to be created have been reduced in size, and studies for application of the stereolithography technique to so-called micromachining have been conducted actively.

For micromachining, the required overall size of the models is up to about hundreds of micrometers, and the components thereof are accordingly required to be formed to have a size at least one order of magnitude smaller than that of the models. To achieve this, it is necessary to attain modeling accuracy of not greater than tens of micrometers, more preferably not greater than about 10 to about 20 micrometers.

In the stereolithography apparatus, the modeling accuracy is considered to principally depend on the accuracy of the thickness of each of the stacked resin layers, and an exposure resolution. For the former, it is necessary to increase the accuracy of the process of forming the resin layers. For the latter, it is necessary to increase the accuracy of the process of irradiation with exposure light. From the viewpoint of the former, it is necessary that a mechanism responsible for supplying resin to a modeling surface and a mechanism responsible for smoothing the resin are close to the modeling surface. From the viewpoint of the latter, on the other hand, a distance between a position from which the exposure light comes and the modeling surface is preferably as short as possible because of the problem of the stability of the exposure light and the like. Also, for the latter, an irradiation element (or irradiation optical system) for irradiation with the exposure light can be said to be preferably fixed in view of the stability of the exposure light.

The exposure resolution is determined depending on the focusing of the exposure light. It is hence necessary that focus is always maintained on the surface of a resin layer being exposed to light during the modeling. However, as more resin layers are stacked, more deviations from the setting of the thickness of the layers are accumulated, which might result in no focus achieved on the surface of the resin layers. In some cases, no focus is achieved on the surface of the resin layers because of the height variations or unevenness of a base surface during the modeling. If such an out-of-focus condition occurs but cannot be detected in the course of the modeling, a judgment as to whether the model is good or not has to be made directly from the model itself after the model is actually completed. This hinders improvements in yield and in productivity.

Japanese Patent Application Laid-Open No. 2004-249508 discloses a stereolithography apparatus in which an exposure light source is fixed whereas a stage is moved, but provides no disclosure about the increase in the accuracy of the thickness of resin to be cured.

This apparatus has an optical unit for achieving focus, and a detector provided in the optical unit detects a reflection of light emitted from a light source provided in the optical unit, whereby focusing is adjusted. With such an arrangement, however, it is difficult to achieve focus with high accuracy because no judgment is made as to whether the focusing of the exposure light itself for actual use in exposure is good or not.

Japanese Patent Application Laid-Open No. 2004-223789 discloses a stereolithography apparatus having an optical system for scanning with exposure light by means of a galvanometer mirror. This apparatus further includes a beam splitter disposed in some midportion of an irradiation optical system for the exposure light, an imaging camera disposed in the path of light split by the beam splitter, and an illumination light source for observation disposed under a substrate serving as a modeling stage. However, there is no disclosure about the increase in the accuracy of the thickness of a resin layer.

In this stereolithography apparatus, when the illumination light source emits illumination light during the modeling, the light transmitted through a glass substrate and a model is introduced by the beam splitter toward the imaging camera disposed in the split light path, and the modeling condition can be recognized by viewing the resultant image. Such an arrangement, however, presents problems in that the illumination light source is essential and in that the materials of the stage and the model are limited to those transparent to the illumination light.

Japanese Patent No. 3294833 discloses an apparatus of a so-called free surface type which includes a tank previously filled with a resin and which creates a model by repeating the exposure of the surface of the liquid resin to light and the downward movement of a stage. In this apparatus, exposure to light is achieved by scanning by means of an irradiation element. There is a large separation between the irradiation element and the liquid surface irradiated with light because an element for smoothing the resin is disposed between the irradiation element and the liquid surface.

This apparatus includes an element for detecting the liquid surface, but does not include an element for observing the modeling condition.

SUMMARY OF THE INVENTION

The present invention is intended for a stereolithography apparatus for creating a three-dimensional object by irradiating a predetermined photo-curable resin with light such as laser light. More particularly, the invention is intended for a stereolithography apparatus suitable for the creation of an object having a size on the order of microns.

According to the present invention, a stereolithography apparatus successively forming a plurality of planar resin layers by curing a predetermined resin, and stacking each of the plurality of planar resin layers in order whenever each of the plurality of planar resin layers is formed, thereby to create a predetermined three-dimensional object thereon, comprises: a) a modeling part for creating a three-dimensional object; b) a supply element for supplying resin to the modeling part; c) a smoothing element for smoothing the resin supplied to the modeling part by the supply element; and d) an irradiation element including a predetermined modulator for modulating light emitted from a light source, the irradiation element directing the modulated light onto the resin smoothed on the modeling part to cure the resin, the supply element, the smoothing element and the irradiation element being fixed in predetermined positions, respectively, the modeling part being positioned so that, when one of the supply element, the smoothing element and the irradiation element is to execute a process, the two remaining elements are not present between the one element and the modeling part.

During each process of resin supply, smoothing and exposure for modeling, the remaining processing elements are not present between the modeling part and the one element responsible for the processing. Thus, the modeling part is brought as close to these elements as possible for the processing. Further, the exposure using the fixed source of the exposure light provides a fixed optical path length during the exposure to stabilize the focusing and to achieve the stable exposure with reduced variations in the amount of light and reduced optical beam vibrations. These attain improvements in the accuracy of a layer thickness and in an exposure resolution during the modeling.

Preferably, the stereolithography apparatus further comprises e) an observation element for image-forming light reflected from the modeling part to make the image thereof viewable, the observation element including: e-1) an optical splitting element provided in some midportion of an optical path in the irradiation element and for splitting the reflected light from the optical path; e-2) an image capturing element for capturing the image of the reflected light split by the optical splitting element; and e-3) a display element for viewably displaying the image captured by the image capturing element, the modeling part being vertically movable by a second driving mechanism, wherein adjustment of a focus position of the light is made by driving the second driving mechanism in accordance with focusing of the light on the resin layers or the smoothed resin during the exposure thereof to the light, the focusing being displayed by the display element.

This prevents the decrease in modeling accuracy for the resin layers, whereby the modeling accuracy for the entire model is held higher than that obtained when no fine adjustment is made. Additionally, the fine adjustment in the course of the modeling renders improvement of the yield and productivity of models over an instance in which whether a model is good or not is not judged until the entire model is completed.

It is therefore an object of the present invention to provide a stereolithography apparatus which is capable of attaining the improved accuracy of the thickness of resin layers and an improved exposure resolution during exposure to light and which is suitable for micromachining.

It is another object of the present invention to provide a stereolithography apparatus which allows the recognition of focusing in the course of modeling and the correction of the focusing.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A, 4B, 4C and 4D are views illustrating focusing in the stereolithography apparatus;

FIGS. 5A and 5B are views illustrating focus adjustment when a modeling base is inclined; and FIG. 6 shows an SEM image of model samples created using the stereolithography apparatus.

DESCRIPTION OF THE PREFERRED EMBODIMENTS

<Overview of Apparatus>

Figure 1:
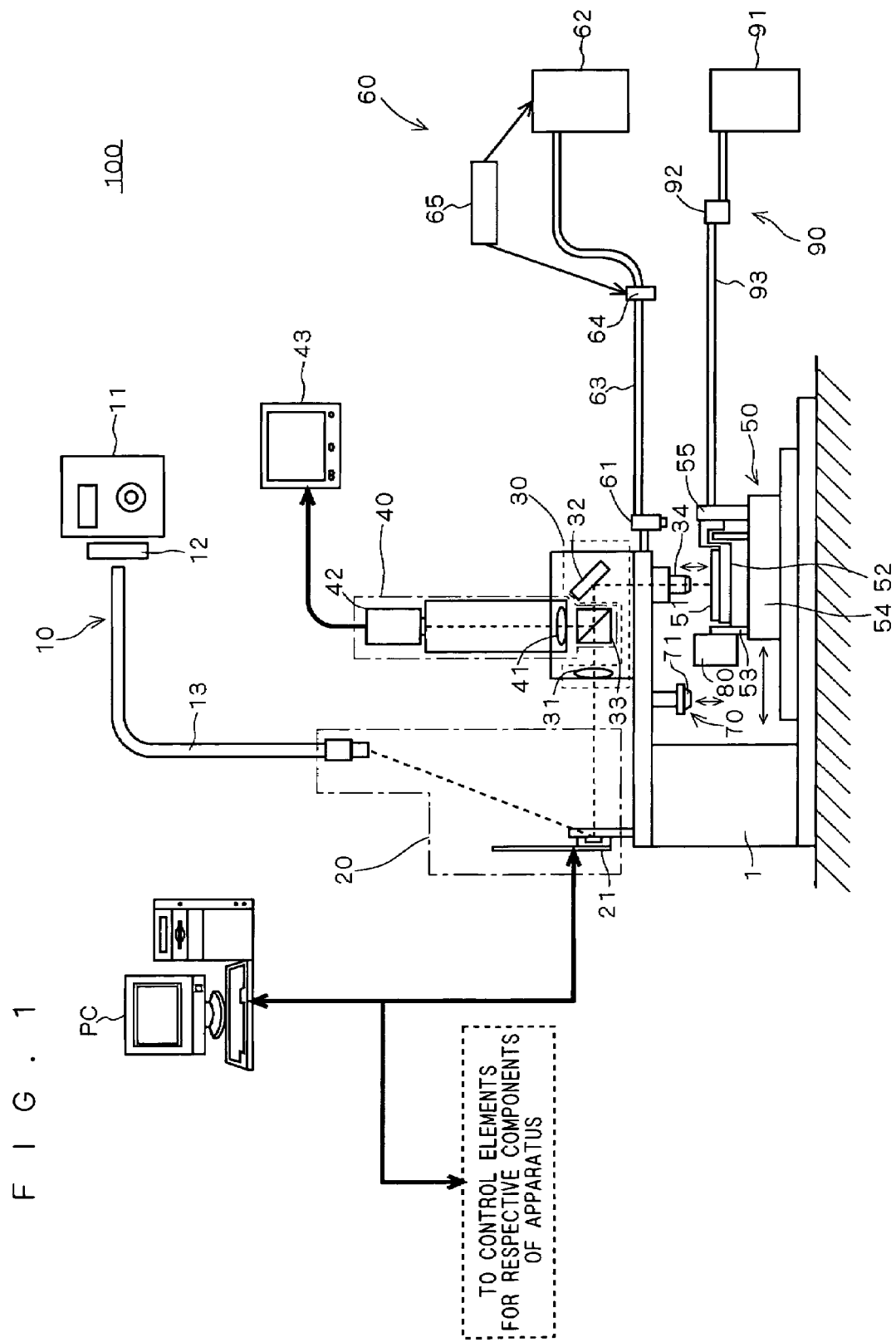
FIG. 1 is a schematic sectional view showing the construction of a stereolithography apparatus according to a preferred embodiment of the present invention.

FIG. 1 is a schematic sectional view showing the construction of a stereolithography apparatus 100 according to a preferred embodiment of the present invention. The stereolithography apparatus 100 is an apparatus for creating a model by so-called stereolithography which can produce a three-dimensional object by repeating the process of exposing to light a coating of photo-curable resin (hereinafter also referred to simply as "resin") having a fixed thickness and applied to a predetermined coating region based on shape data and the process of stacking layers of the resin one on top of another. The stereolithography apparatus 100 principally includes a light source part 10, an illumination optical system 20, a projection optical system 30, a surface observation system 40, a modeling part 50, a supply part 60, a smoothing part 70, a beam measurement part 80, a vacuum fixing part 90, and a control computer PC. The construction of the parts is shown only schematically in FIG. 1, and the components in FIG. 1 are not drawn to scale.

The light source part 10 includes a predetermined light source 11 for emitting exposure light through a heat absorbing filter 12. The type of the light source 11 is not particularly limited, and a suitable source capable of curing the resin for use in modeling, e.g. laser, a lamp, an LED, may be used as the light source 11. In other words, light having an appropriate wavelength, e.g. UV light, visible light and infrared light, may be used as the exposure light. A plurality of types of light sources may be provided for switching therebetween. The exposure light emitted from the light source 11 is directed through an optical fiber 13 to the illumination optical system 20.

Although not shown in detail, in the illumination optical system 20, a modulator 21 such as, for example, a DMD (digital mirror device) is irradiated with the exposure light emitted from the light source 11 and then reflects the light as appropriate, and the light reflected from the modulator 21 is directed into the projection optical system 30 while being adjusted by means of a predetermined lens group not shown.

The use of the DMD as the modulator 21 will be described briefly. The DMD includes a one-dimensional array of unit blocks each composed of a two-dimensional array of micromirrors, and driving memory cells corresponding to the respective micromirrors. The DMD can change the posture of each of the micromirrors depending on whether a corresponding driving memory cell is written or not, thereby to control whether each of the micromirrors directs the exposure light toward the projection optical system 30 or not. Because whether to direct the exposure light onto a minute area can be determined in association with each of the micromirrors, in the modeling part 50 to be described later, such exposure that the area to be irradiated with the light reflected from each of the micromirrors is treated as a unit area can be performed. Determining whether to write the driving memory cell corresponding to each of the micromirrors depending on the descriptions of cross-sectional shape data representing each sliced cross-section allows the definition of the area to be irradiated with the exposure light in accordance with the cross-sectional shape represented by the data. This achieves the exposure of only an area determined by the cross-sectional shape to light. The use of such a DMD allows the exposure of even an area having an exposure size of 1024 pixels by 768 pixels to light.

The modulator 21 is not limited to an element which effects two-dimensional control such as the DMD, but may be an element which effects one-dimensional control such as a liquid crystal shutter, and an element which controls a dotted beam. From the viewpoint of exposure efficiency, it is needless to say that the use of the element which effects two-dimensional control such as the DMD is preferred.

The projection optical system 30 is responsible for an exposure process using the exposure light incident from the modulator 21. In the projection optical system 30, the exposure light is adjusted by means of a predetermined lens group 31 and a mirror group 32, and the adjusted exposure light through an objective lens 34 is focused onto a modeling base 51 of the modeling part 50. The light reflected from the modeling part 50 is received by the objective lens 34, and is then directed to the surface observation system 40 by a beam splitter 33 provided in an optical path of the projection optical system 30.

In the stereolithography apparatus 100 according to the preferred embodiment, the objective lens 34 is fixed to a base body 1 and is located to direct the exposure light vertically downwardly. That is, the exposure is performed, with the direct irradiation light source in a fixed position. Such an arrangement has advantages over a system in which an irradiation light source is moved or scanned to perform the exposure in that the focusing is stabilized because of fixing of the optical path length and in that variations in the amount of light and the vibrations of the optical beam due to the movement and the like are reduced. Even if a layer thickness (the thickness of each of the stacked layers) of not greater than 20 µm and an exposure resolution of not greater than 5 µm are assumed in the system in which the irradiation light source is moved or scanned, the scanning deviation of the exposure light influences the modeling accuracy, and further improvements in accuracy beyond such assumption is not expected.

Therefore, the arrangement of the projection optical system 30 according to the preferred embodiment contributes to the improvement in the exposure resolution during the modeling.

The stereolithography apparatus 100 is constructed to perform the exposure after the modeling part 50 including the modeling base 51 smoothly coated with the resin at a different location in a manner to be described later is located immediately under the objective lens 34 by a horizontal drive mechanism 54. Because there are no other components between the objective lens 34 and the modeling base 51, the exposure is accomplished with a to-be-exposed surface on the modeling base 51 brought sufficiently close to the objective lens 34. Preferably, the spacing between the objective lens 34 and the modeling base 51 is not greater than 20 µm.

The surface observation system 40 includes a predetermined lens group 41 for adjusting the light coming from the beam splitter 33, that is, the reflected light from the modeling part 50, a CCD camera 42 for receiving the image of the adjusted light, and a monitor 43 for displaying the received image. The CCD camera 42 used herein has sufficiently sensitivity to the wavelength of the exposure light. This allows the direct observation of the condition of the model being exposed to light by receiving the reflected light while the exposure to the exposure light is performed.

In the stereolithography apparatus 100 according to the preferred embodiment, the focus position can be adjusted by using such a surface observation system 40, which will be described later.

The modeling part 50 is a part in which a three-dimensional object is created. The modeling part 50 includes a stage 52 capable of fixing thereon the modeling base 51 serving as a base member during the modeling, and a modeling tank 53 containing the stage 52 inside. A suitable planar member such as a glass substrate and the like may be used as the modeling base 51. The modeling base 51 is selected and used as appropriate depending on the type of resin, the structure and size of the model and the like. The modeling base 51 may have different modelable areas depending on the constructions of the modulator 21 and the projection optical system 30. When the DMD having an exposure area of 1024 pixels by 768 pixels is used as the modulator 21, the modelable area is, for example, 15 cm by 15 cm.

Figure 2:
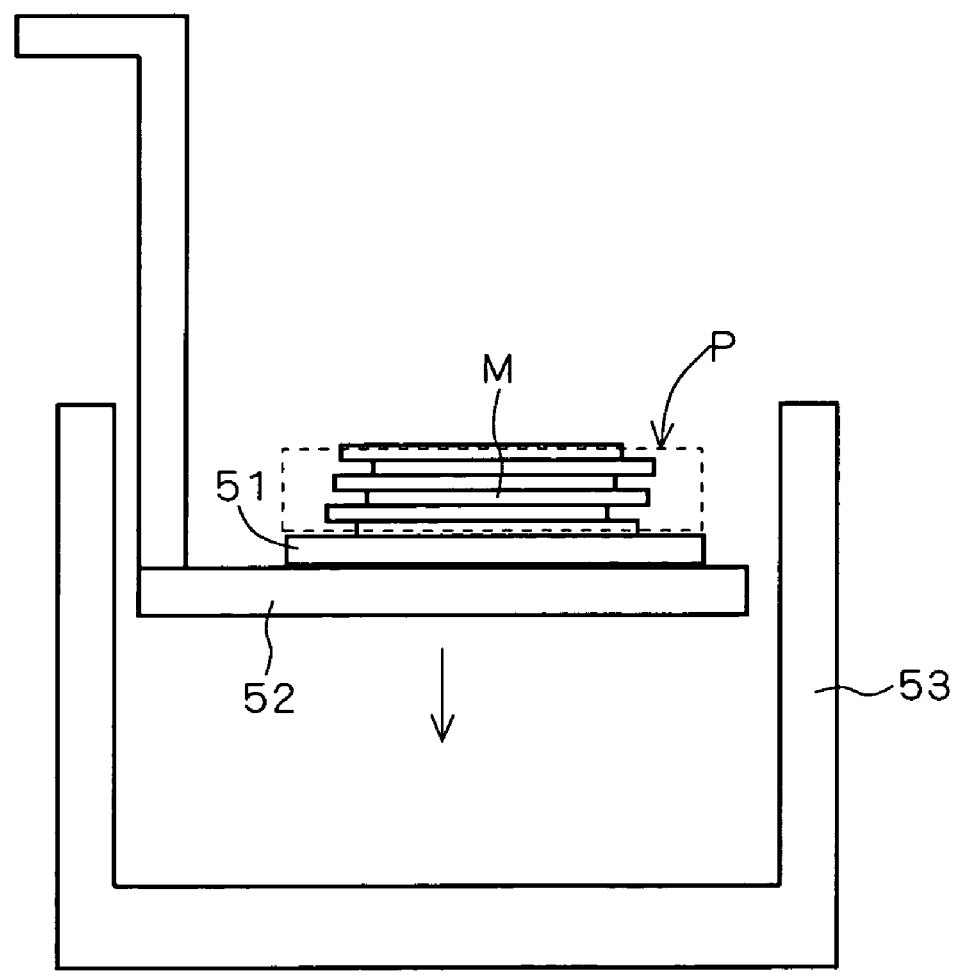
FIG. 2 is a view illustrating the creation of a model in the stereolithography apparatus.

FIG. 2 illustrates the creation of a model in the stereolithography apparatus 100. For the modeling, the coating with a resin layer above the modeling base 51 and the exposure of the resin layer to light are repeated based on the cross-sectional shape data, whereby a model M composed of a stack of resin layers cured by the exposure is built up stepwise together with an uncured resin portion P in the modeling tank 53. When the resin has a low viscosity, there arises such a situation that a cured portion is soaked in the liquid resin collected in the modeling tank 53. In any case, the model M together with the modeling base 51 is removed from the modeling tank 53 after the completion of the processing of all cross-sections, whereby the three-dimensional object formed on the modeling base 51 is obtained. Uncured resin sometimes sticks to the periphery of the three-dimensional object, but is removed by a predetermined cleaning element and the like.

The modeling tank 53 is movable in a horizontal direction (preferably in two horizontal directions along X and Y axes) by the horizontal drive mechanism 54. In the stereolithography apparatus 100 according to the preferred embodiment, the supply part 60 responsible for supplying the resin to the modeling part 50, the smoothing part 70 responsible for smoothing the supplied resin, and the objective lens 34 responsible for exposing the smoothed resin to light are provided in separate positions, to which the modeling part 50 is moved in order by the horizontal drive mechanism 54 so that the supply part 60, the smoothing part 70 and the objective lens 34 perform respective processes. Thus, the modeling part 50 is movable between the supply part 60, the smoothing part 70 and the objective lens 34 by the horizontal drive mechanism 54. The horizontal drive mechanism 54 is implementable by a known drive mechanism such as, for example, a ball screw. Preferably, the driving accuracy of the horizontal drive mechanism 54 is not greater than ±0.5 µm. The stage 52 is movable in a vertical direction (along the Z axis) within the modeling tank 53 by a vertical drive mechanism (elevator) 55. Preferably, the vertical drive mechanism 55 is capable of precise positioning with driving accuracy of ±0.2 µm. This is accomplished, for example, by the use of a known linear scale.

In the modeling part 50, the exposure light whose irradiation area is determined in corresponding relation to the cross-sectional shape in accordance with the cross-sectional shape data is directed through the objective lens 34 onto a coating of photo-curable resin formed on the modeling base 51 to have a predetermined thickness by the actions of the supply part 60 and the smoothing part 70 which will be described later so as to cure only the irradiation area of the resin, thereby forming a resin layer which embodies a partial cross-section of the three-dimensional object to be created. In a strict sense, when a resin layer is already formed, another coating of resin is formed on the resin layer. In such instances including those described above, expressions such that a resin layer is formed "on the modeling base 51," the exposure light is directed "onto the modeling base 51" and the like shall be used for ease of expression in this preferred embodiment.

After the exposure is performed, the stage 52 together with the stack of resin layers formed thereon is moved downwardly a predetermined distance by the vertical drive mechanism 55, and a similar process is performed on the next cross-section. Such a process is repeated a predetermined number of times from bottom to top of the three-dimensional object, whereby the three-dimensional object is obtained.

The supply part 60 is responsible for supplying a predetermined amount of photo-curable resin to the modeling part 50 for the creation of such a model. Specifically, with the modeling part 50 located immediately under a dispenser nozzle 61 by driving the horizontal drive mechanism 54, a predetermined amount of resin for modeling which is stored in a pressurized tank 62 is supplied through a supply pipe 63, and applied from the dispenser nozzle 61 onto the modeling base 51 of the modeling part 50. The amount of resin supply in a single supply operation is adjustable by a dispenser controller 65 controlling the pressure in the pressurized tank 62 and the opening/closing of a dispenser valve 64. Preferably, the pressurized tank 62 has an agitation function, and is capable of executing an agitation operation in response to a predetermined operation instruction. This enables the resin in the pressurized tank 62 to be held uniform. During the supply of the resin, there is no other components between the dispenser nozzle 61 and the modeling base 51. Thus, the resin supply is accomplished, with the dispenser nozzle 61 and the modeling base 51 brought sufficiently close to each other. The form of resin supply for creation of a single cross-section may be appropriately determined depending on the type of resin and the shape of the cross-section to be created. Accordingly, the amount of supply is appropriately determined.

The smoothing part 70 is responsible for smoothing the resin supplied by the supply part 60 by means of a recoater 71 provided on the base body 1. The recoater 71 is a member known also as a squeegee or a knife edge, and having, for example, at least a substantially planar tip portion.

The smoothing of the resin in the smoothing part 70 is carried out after the modeling part 50 subjected to the resin supply onto the modeling base 51 by the supply part 60 is moved to a position immediately under the smoothing part 70 by the horizontal drive mechanism 54. After such a positional relationship is established, the recoater 71 free to move back and forth is moved across over the modeling base 51 by the action of a predetermined drive element not shown, so that the resin which coats the modeling base 51 is uniformed because of scraping off with the recoater 71 and the like. The surplus resin scraped off is discharged to a discharge part not shown.

A distance between the recoater 71 and the modeling base 51 (or the preceding, resin layer cured) during the movement of the recoater 71 determines the thickness of the resin coating when exposed to light. In the stereolithography apparatus 100 according to the preferred embodiment, it is accomplished to smooth the resin with the recoater 71 and the modeling base 51 brought sufficiently close to each other, because the vertical drive mechanism 55 achieves the high positioning accuracy of the stage 52 (that is, the modeling base 51) and there are no other components between the recoater 71 and the modeling base 51 during the smoothing. Preferably, a distance of about 10 µm is provided between the recoater 71 and the modeling base 51. After the exposure of the resin layer, the vertical drive mechanism 55 moves the stage 52 (that is, the modeling base 51) downwardly a distance corresponding to the thickness prior to the next resin coating. Repeating the coating with resin, the exposure of the resin and the downward movement of the stage 52 consequently allows the stereolithography apparatus 100 according to the preferred embodiment to form the resin layer having a thickness of about 10 µm which is much smaller than that obtained by conventional stereolithography apparatuses.

The significance of the above-mentioned positional relationship between the objective lens 34 (the projection optical system 30), the modeling part 50, the supply part 60 and the smoothing part 70 will be described. From the viewpoint of improvements in modeling accuracy in a stereolithography apparatus, it is in general necessary to bring the exposure light into focus exactly on the resin surface. To this end, it is desirable that a distance between the objective lens 34 and the position where the resin is irradiated with light is as short as possible. For improvements in the accuracy of the thickness of the resin coating, it is desirable to bring a supply element for supplying the resin and a smoothing element for smoothing the resin as close to a modeling surface as possible.

If a mechanism in which a projection optical system for the exposure light is movable while a modeling part is fixed is employed, there arises a need to move the supply element and the smoothing element between the modeling part and the projection optical system for the supply and smoothing of the resin. This imposes significant limitations on the locations of the supply element and the smoothing element. It is possible to employ a mechanism in which the projection optical system is retracted during the operation of the supply element and the smoothing element whereas the supply element and the smoothing element are retracted during the exposure to light. This mechanism, of course, involves a complicated apparatus structure, and also results in the decreasing irradiation accuracy of the exposure light, as compared with a mechanism in which the projection optical system is fixed. This is undesirable from the viewpoint of improvements in modeling accuracy.

The stereolithography apparatus 100 shown in FIG. 1, on the other hand, is constructed such that the supply part 60 for supplying the resin, the smoothing part 70 for smoothing the supplied resin and the objective lens 34 for exposing the smoothed resin to light are provided in respectively separate positions within substantially the same horizontal plane, and the modeling part 50 for modeling is movable by the horizontal drive mechanism 54 under the supply part 60, the smoothing part 70 and the objective lens 34. For the processing in the supply part 60, the smoothing part 70 and the objective lens 34, the modeling part 50 is moved by the horizontal drive mechanism 54 to the positions immediately under the three above-mentioned components in order so as to be opposed to the three above-mentioned components. For each one of the processes of supplying the resin, smoothing the resin and exposing the resin to light in the stereolithography apparatus 100, there are no components responsible for the other processes between the modeling part 50 and a component responsible for each one of the processes, but the modeling part 50 is brought as close to the above-mentioned components as possible for the respective processes. This is one reason why the stereolithography apparatus 100 accomplishes higher modeling accuracy than the conventional apparatuses.

The beam measurement part 80 is provided to measure the exposure light directed from the objective lens 34. The beam measurement part 80 measures the power and shape of the exposure light and the distribution of the amount of light by means of a predetermined measurement element not shown at a predetermined measurement position (e.g., the image-forming position of the exposure light immediately under the objective lens 34) lying in the optical path of the exposure light. As illustrated in FIG. 1, the beam measurement part 80 may be mounted to the modeling part 50 so as to be located in the measurement position by driving the horizontal drive mechanism 54, or be movable by an independent drive element. Alternatively, the beam measurement part 80 may be attachable to and detachable from the modeling part 50 so as to be attached to the modeling part 50 when required and otherwise detached therefrom. This provide protection for the beam measurement part 80 when not in use from contamination. In any configuration, the beam measurement part 80 directly measures the exposure light actually used for the exposure in a position where the exposure is performed, thereby to accurately grasp the condition of the exposure light to be used for modeling.

Figure 3A:
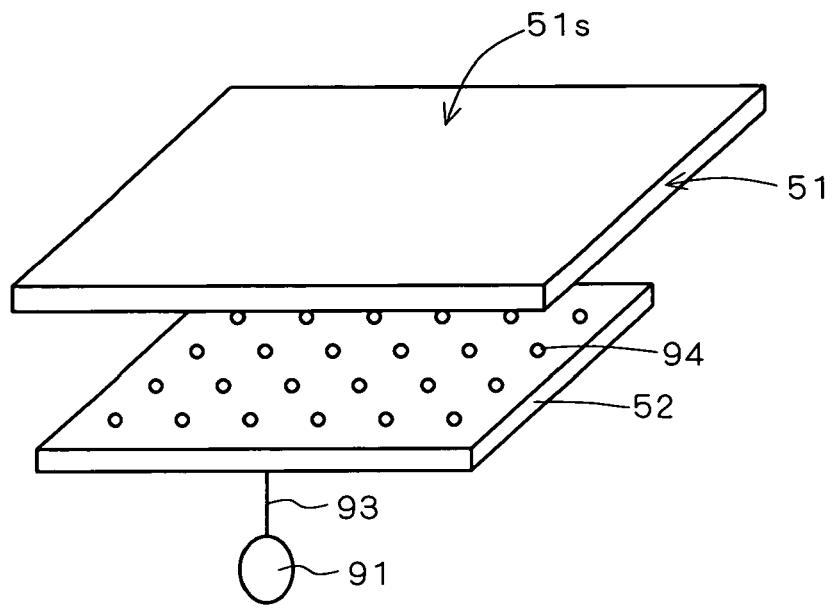
FIGS. 3A and 3B are views illustrating the concept of fixing by suction.
Figure 3B:
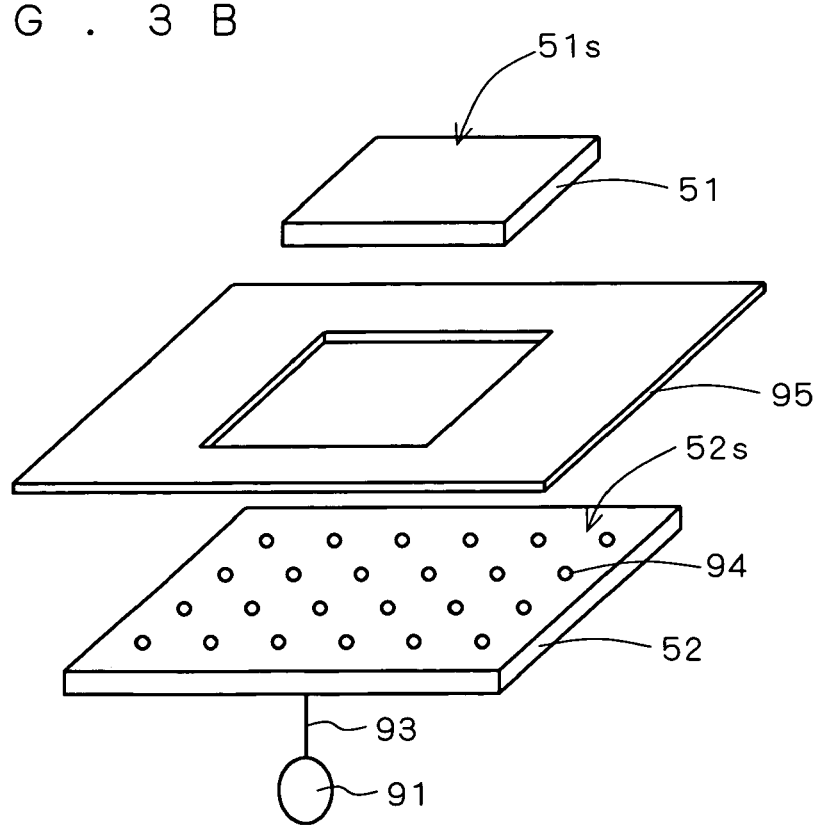

The vacuum fixing part 90 is provided to fix the modeling base 51 to the stage 52 by suction. FIGS. 3A and 3B are views illustrating the concept of the fixing by suction. In the stereolithography apparatus 100 according to the preferred embodiment, a vacuum pump 91 communicates with a plurality of suction holes 94 (not shown in FIG. 1) provided in the stage 52 through an exhaust pipe 93 with a solenoid valve 92 inserted therein, as shown in FIG. 3A. When the vacuum pump 91 is actuated and the solenoid valve 92 is opened with the modeling base 51 placed on the stage 52, the modeling base 51 is fixed to the stage 52 by the negative pressure in the suction holes 94.

If the area of a modeling surface 5 is of the modeling base 51 is smaller than the area of a holding surface 52s of the stage 52 so that the modeling base 51 cannot cover all of the suction holes 94 in the stage 52, the fixing is not achieved only by placing the modeling base 51 on the stage 52 as shown in FIG. 3A. In this case, a mask 95 having a central portion hollowed in accordance with the size of the modeling base 51 (or an equivalent of the mask 95 obtained by combining a plurality of pieces together) is prepared and placed to surround the modeling base 51, as shown in FIG. 3B. Thus, some of the suction holes 94 which cannot be covered by the modeling base 51 are closed by the mask 95, whereby the modeling base 51 is fixed.

A conceivable manner of fixing the modeling base 51 to the stage 52 includes the provision of a fixture such as fixing hooks or sandwiching members or a fixing frame on the stage for the fixing, and the use of the magnetic force of a magnet for the fixing. The former is undesirable because of the following problems: a sufficient flatness is not obtained when the modeling base is in sheet form especially in a central portion; there is a risk that the fixture and the fixing frame interfere with the recoater 71 during the operation of the recoater 71; and a need to move the fixture and the fixing frame arises in accordance with the size of the modeling base to result in burdensome operations and insufficient positioning accuracy. The latter is undesirable because of the problem that, if the modeling base is required to be magnetic or the photo-curable resin for use in modeling contains a magnetic material, the presence of the magnetic force makes the dispersion or orientation of the magnetic material uneven, and also results in increased costs.

In the stereolithography apparatus 100 according to this preferred embodiment, on the other hand, the mask 95 of any material which is flat and thinner than the modeling base 51 and which can cover the stage 52 can ensure the fixing of the modeling base 51 without the interference with the recoater 71. Thus, this preferred embodiment can reliably fix the modeling base 51 to the stage 52 conveniently at low costs even if the modeling base 51 is smaller in size than the stage 52.

The control computer PC is provided to control the operations of the various components of the stereolithography apparatus 100. A general-purpose personal computer may be used as the control computer PC. The control computer PC gives predetermined operating signals to control elements responsible for controlling the operations of the above-mentioned components in accordance with a predetermined control program not shown, and receives response signals from the above-mentioned components, thereby to achieve the modeling process in the stereolithography apparatus 100. The control computer PC is responsible for a variety of operation control processes including, for example, the process of acquiring the cross-sectional shape data representing each sliced cross-section of the three-dimensional object to be created and previously generated by the control computer PC or another computer not shown, and setting the ON/OFF state of the exposure light in the modulator 21 based on the shape data about each cross-section, thereby causing the exposure to light in accordance with the cross-sectional shape.

The use of the stereolithography apparatus 100 having the above-mentioned construction accomplishes the high-accuracy model creation with a layer thickness of 10 µm and an exposure resolution of 2 µm, as illustrated in FIG. 6. That is, the stereolithography apparatus 100 according to the preferred embodiment is a preferred apparatus for micromachining.

In the stereolithography apparatus 100, the modeling part 50 is horizontally movable, and the objective lens 34 (the projection optical system 30), the supply part 60 and the smoothing part 70 are provided over the modeling part 50 independently of each other and located within substantially the same horizontal plane. Thus, if there arises a need for the maintenance of each of the three above-mentioned components, it is only necessary to retract the modeling part 50 from the position immediately under a component to be subjected to the maintenance for easy access to the component. The stereolithography apparatus 100 according to the preferred embodiment achieves improvements in maintenance in addition to the simplified apparatus construction.

<Adjustment of Focus>

Next, the adjustment of the focus of the exposure light in the stereolithography apparatus 100 according to the preferred embodiment will be described.

FIGS. 4A, 4B, 4C and 4D are views illustrating focusing in the stereolithography apparatus 100 according to the preferred embodiment. At the start of the modeling, the focus F is achieved on the surface of the modeling base 51 prior to the formation of a resin layer PL, as shown in FIG. 4A. This is to absorb changes in the stereolithography apparatus 100 with time. Thereafter, as shown in FIGS. 4B and 4C, the formation of a resin layer PL having a constant thickness (e.g., 10 μm) and the exposure of the resin layer PL are repeated. Each time a resin layer is formed, the focus F must be achieved on the surface of the resin layer. More specifically, an absolute focus position (the level indicated by the dotted line in FIGS. 4A to 4D) in space may be considered to remain unchanged because the objective lens 34 is fixed to the base body 1. Thus, the focus on the surface of the resin layer is achieved by bringing the absolute level of the resin layer surface in space to the focus position. Ideally, the focus is achieved on the surface of any one of the resin layers PL by repeatedly forming the resin layers PL having a completely constant thickness and downwardly moving the stage 52 a distance exactly equal to the thickness.

Actually, as more resin layers PL are stacked, more deviations from the setting of the layer thickness are accumulated, which might result in no focus F achieved on the surface of the resin layers, as shown in FIG. 4D. In some cases, no focus is achieved on the surface of the resin layers because of the height variations or unevenness of a base surface during the modeling.

In the stereolithography apparatus 100, on the other hand, the exposure light is focused onto an uncured resin layer formed to coat the modeling base 51, and the light reflected from the resin layer is received by the objective lens 34, directed by the beam splitter 33 toward the surface observation system 40 and received as an image by the CCD camera 42. In other words, the exposure light directed for the exposure is used as light illuminating the resin layer to be exposed. This enables an operator to make real-time observations of the condition of the resin layer being exposed to light by means of the monitor 43 of the surface observation system 40, thereby easily judging whether focusing is obtained or not as shown in FIGS. 4A to 4D during the exposure. Further, there is no need to provide an additional illuminating light source, and the materials of the modeling base 51 and the resin used for the modeling are not subjected to limitations resulting from the illuminating light source. Although no light is directed between adjacent exposure processes, the exposure time is generally set at about 0.5 to 1 second, during which the operator can makes the above-mentioned judgment without any problems.

Thus, the stereolithography apparatus 100 according to the preferred embodiment enables the operator to check whether the focus is achieved on the surface of a resin layer corresponding to a cross-section just while the resin layer is exposed to light. During the exposure, the operator can no longer adjust the focus for the resin layer. However, during a time interval between the completion of the exposure for the resin and the execution of the exposure of the next resin layer corresponding to the next cross-section, the operator can cause the vertical drive mechanism 55 to perform a fine adjustment operation by entering a predetermined fine adjustment operation instruction into the control computer PC and the like, to make the fine adjustment of the vertical position of the stage 52, thereby making the fine adjustment of the focus position in accordance with the result of the observation by means of the monitor 43. The above-mentioned fine adjustment may be made, for example, at the same time that the stage 52 is moved downwardly prior to the formation of the resin layer or during a time interval between the downward movement of the stage 52 and the execution of the exposure.

Although it is impossible to improve the modeling accuracy for the resin layer which has already been exposed to light in an out-of-focus condition, the above-mentioned fine adjustment prevents the decrease in the modeling accuracy for the subsequent resin layers, whereby the modeling accuracy for the entire model is held higher than that obtained when no fine adjustment is made. Additionally, such fine adjustment in the course of the modeling renders improvement of the yield and productivity of models over an instance in which whether a model is good or not is not judged until the entire model is completed.

<Modifications>

Referring to FIG. 1, the smoothing part 70, the objective lens 34 and the supply part 60 are arranged in the order named from the left within substantially the same horizontal plane over a region in which the modeling part 50 is horizontally movable. This arrangement is not essential according to the present invention. The arrangement of the smoothing part 70, the objective lens 34 and the supply part 60 may be different from that shown in FIG. 1 as far as the modeling part 50 can individually move close to the three above-mentioned components. The smoothing part 70, the objective lens 34 and the supply part 60 may be arranged in a different order or be two-dimensionally arranged within substantially the same horizontal plane.

In the above-mentioned preferred embodiment, the modeling process includes: first bringing the focus position onto the modeling base 51, and then forming a resin layer for the modeling. However, when the modeling base 51 is inclined as shown in FIG. 5A, it is difficult to stack resin layers on the modeling base 51 with accuracy if each resin layer is formed as it stands. It should be noted that the inclination in FIGS. 5A and 5B are exaggerated for illustration. In such a case, an underlying layer BL whose surface extends horizontally may be provided on the entire modeling surface of the modeling base 51 as shown in FIG. 5B, and thereafter, the model be created. For example, a resin for use in the modeling may be used directly as the underlying layer BL. The modeling is performed so that the underlying layer BL thus provided is treated as a base, whereby the underlying layer BL cancels the influence of height variations and unevenness of the modeling base 51, if any. This accomplishes high-accuracy modeling.

In the above-mentioned preferred embodiment, the focusing is corrected while the operator observes the resin layer surface by means of the surface observation system 40. However, if the deviation of the layer thickness (or the vertical position) resulting from the stacking of more layers, that is, the positional deviation of the resin layer to be exposed to light from the focus position can be predicted from the type, density or viscosity of the resin or if the statistical tendency of the deviation is known, the distance through which the stage 52 moves may be adapted to change in accordance with the number of stacked layers for the fine adjustment of the focus position. For example, a data set (or data table) in which the number of stacked layers and the amount of fine adjustment are associated with each other, and functions of the amount of fine adjustment using the number of stacked layers, a physical property value of the resin, and the like as variables may be previously stored in the control computer PC, and the amount of fine adjustment obtained therefrom be suitably read from the control computer PC. Such a data set may be defined for each modeling position. Additionally, results of the adjustment made in a manner described in the above-mentioned preferred embodiment may be stored as the above-mentioned data set in the control computer PC and be provided for subsequent modeling. The modifications as described above may be combined together.

EXAMPLE

FIG. 6 shows a SEM (scanning electron microscope) image of model samples created using the stereolithography apparatus 100 according to the above-mentioned preferred embodiment. The modeling was carried out by employing laser light having a wavelength of 405 nm as a light source and using an acrylate resin (having a viscosity of 1500 to 2500 mPa·s at 25° C.) as the photo-curable resin. Each of the model samples is created on a base surface, and has a 26 by 26 μm square bottom surface, a 5 by 5 μm square top portion, and a height of about 70 μm by stacking seven resin layers each having a thickness of about 10 μm. Although not shown in detail, a modeling error relative to design data was about 2 μm or less.

Thus, a layer thickness of 10 μm and an exposure resolution of 2 μm were attained in the stereolithography apparatus 100 according to the preferred embodiment.

While the invention has been described in detail, the foregoing description is in all aspects illustrative and not restrictive. It is understood that numerous other modifications and variations can be devised without departing from the scope of the invention.

What is claimed is:

1. A stereolithography apparatus, said stereolithography apparatus successively forming a plurality of planar resin layers by curing a predetermined resin, and stacking each of said plurality of planar resin layers in order whenever each of said plurality of planar resin layers is formed, thereby to create a predetermined three-dimensional object, said stereolithography apparatus comprising:
   a) a modeling part for creating a three-dimensional object thereon;
   b) a supply element for supplying resin to said modeling part;
   c) a smoothing element for smoothing the resin supplied to said modeling part by said supply element;
   d) an irradiation element including a predetermined modulator for modulating light emitted from a light source, said irradiation element directing the modulated light onto the resin smoothed on said modeling part to cure said resin; and
   e) an observation element for image-forming the modulated light reflected from said modeling part to make the image thereof viewable, said observation element including:
   e-1) an optical splitting element provided in some midportion of an optical path in said irradiation element and for splitting said reflected light from said optical path;
   e-2) an image capturing element for capturing the image of said reflected light split by said optical splitting element; and
   e-3) a display element for viewably displaying the image captured by said image capturing element,
   said supply element, said smoothing element and said irradiation element being fixed in predetermined positions, respectively,
   said modeling part being positioned so that, when one of said supply element, said smoothing element and said irradiation element is to execute a process, the two remaining elements are not present between said one element and said modeling part,
   said modeling part being vertically movable by a first driving mechanism,
   wherein adjustment of a focus position of said light is made by driving said first driving mechanism every time of forming each of said plurality of planar resin layers, in accordance with focusing of said light on said resin layers or the smoothed resin during of the exposure thereof to said light, said focusing being displayed by said display element, and the distance though which said modeling part moves for said adjustment of said focus position of said light is varied in accordance with the number of said resin layers having been stacked on said modeling part a storing part for previously storing a data set in which the number of stacked resin layers on said modeling part and the distance through which said modeling part moves for said adjustment of focus position of said light are associated with each other, wherein said adjustment of focus position of said light is made based on said data set.

2. The stereolithography apparatus according to claim 1, wherein:
   said supply element, said smoothing element and said irradiation element are fixedly provided independently of each other within substantially the same horizontal plane;
   said modeling part is horizontally movable substantially in parallel with said substantially the same horizontal plane by a second driving mechanism; and
   each time said supply element, said smoothing element and said irradiation element execute respective processes, said second driving mechanism locates said modeling part in opposed and adjacent relation to said one element.

3. The stereolithography apparatus according to claim 1, wherein:
   said supply element, said smoothing element and said irradiation element are fixedly provided independently of each other within substantially the same horizontal plane;
   said modeling part is horizontally movable substantially in parallel with said substantially the same horizontal plane by a second driving mechanism; and
   when each of said supply element, said smoothing element and said irradiation element executes a process, said second driving mechanism moves said modeling part in corresponding relation to the order of the processes to locate said modeling part in opposed and adjacent relation to said one element.

4. The stereolithography apparatus according to claim 1, wherein said irradiation element is fixed in a predetermined position, and
   modeling on said modeling part is started after the focus position of said light directed from said irradiation element is placed on the surface of a predetermined modeling base fixed to said modeling part.

5. The stereolithography apparatus according to claim 4, wherein
   a smooth surface made of a predetermined resin can be formed on the entire modeling surface of said modeling base prior to the start of the modeling in said modeling part.

6. The stereolithography apparatus according to claim 1, further comprising f) a measurement element for measuring the light directed from said irradiation element in an optical path.

7. The stereolithography apparatus according to claim 6, wherein said measurement element is attachable to and detachable from said stereolithography apparatus in a predetermined position.

* * * * *